US005713473A

United States Patent [19]

Satake et al.

[11] Patent Number: 5,713,473

[45] Date of Patent: Feb. 3, 1998

[54] COLOR SORTING APPARATUS FOR BEANS

[75] Inventors: Satoru Satake, Tokyo; Ryo Marukawa, Hiroshima, both of Japan

[73] Assignee: Satake Corporation, Tokyo, Japan

[21] Appl. No.: 505,890

[22] Filed: Jul. 24, 1995

[30] Foreign Application Priority Data

Jul. 27, 1994 [JP] Japan .................................... 6-196062

[51] Int. Cl.[6] ............................ B07C 5/342; B65G 15/10

[52] U.S. Cl. .......................... 209/580; 209/639; 209/922; 209/938; 198/813; 198/817; 198/837; 15/309.2

[58] Field of Search .................................... 209/576, 577, 209/580, 581, 582, 588, 639, 922, 938, 939; 198/813, 816, 817, 837, 841; 250/223 R; 15/309.2

[56] References Cited

U.S. PATENT DOCUMENTS 3,977,526 8/1976 Gordon et al. ....................... 209/639 X
4,629,062 12/1986 Silverthorn et al. ..................... 198/813
4,919,534 4/1990 Reed .................................... 209/588 X
5,348,033 9/1994 Levit .................................... 198/817 X

FOREIGN PATENT DOCUMENTS

A-63-200878 8/1988 Japan .
A-6-34974 5/1994 Japan .

*Primary Examiner*—Tuan Nguyen
*Attorney, Agent, or Firm*—Fish & Richardson, P.C.

[57] ABSTRACT

A color sorting apparatus for beans includes a transferring device for transferring beans to be sorted to a detection position, an illuminating device for illuminating the bean at the detection position, a light receiving device for receiving a transmitted light transmitted through the bean and outputting a detection signal, a control device for operating the detection signal, comparing the detection signal operated with a predetermined threshold value to determine whether the bean is a good or defective one, and outputting an ejection signal when the bean is determined as a defective one, and a sorting device for removing the defective bean based on the ejection signal. The transferring device includes two endless belts defining therebetween a parallel gap on which the beans are held and a driving motor for driving the endless belts. The illuminating device is provided below the parallel gap defined by the two endless belts and the light receiving device is provided at a position opposite to the illuminating device with the bean being interposed therebetween. As the beans are stably transferred to the detection position, the detection signals based on the transmitted light from the beans are stably obtained without being influenced by the transferring device.

5 Claims, 4 Drawing Sheets

COLOR SORTING APPARATUS FOR BEANS

BACKGROUND OF THE INVENTION

1. Field of the Invention

The present invention relates to a color sorting apparatus, and more particularly to a color sorting apparatus for such beans as peanuts.

2. Description of the Related Art

In carrying out sorting of beans, foreign materials such as stones, earth and seeds of grass which are mixed in the raw material beans can be removed with comparatively ease by means of a gravity sorter, a wind separator and the like. Such defective beans as unripe or immature ones or worm-eaten ones can effectively be removed by the conventional color sorting apparatus disclosed in, for example, Japanese Patent Application Kokai Publication No. Sho 63-200878 in which a bichromatic method based on the reflected light from the surface of the bean to be sorted is adopted. However, it is theoretically impossible to sort a bean with mold which is present internally within the beans by the conventional color sorting apparatus adopting the bichromatic method. Further, the conventional color sorting apparatus based on the reflection light cannot sufficiently sort an externally moldy bean in which mold is present on the outer surface of the beans.

As a color sorting apparatus which is capable of sorting a defective bean in which a defective portion is present within the beans but is not present on an exterior of the beans, for example, Japanese Patent Application Kokoku Publication No. Hei 6-34974 discloses one in which two kinds of specific wavelengths of light beams which transmit through the bean to be sorted are irradiated, and the determination as to whether the bean is good or defective is made by comparing the ratio of intensities of the two kinds of transmitted light beams in the near infrared wavelength region with a predetermined threshold value.

In the above color sorting apparatuses, the beans to be sorted are supplied in a free-fall state to the detection position to which the light beams are irradiated. More specifically, as shown in FIG. 1 which shows a typical conventional color sorting apparatus, the beans to be sorted are supplied to the detection position 43 by a feeding means which comprises a vibration feeder 40 and a slanted supply chute 41 having a V-shape in section. The upper end of the supply chute 41 is coupled to the vibration feeder 40 and the lower end 42 thereof is directed to the detection position 43. In operation, the beans to be sorted are supplied to the upper end of the supply chute 41 by the vibration feeder 40 with certain intervals being provided therebetween and, after having been aligned in a single stream by the supply chute 41, they are discharged from the lower end of the supply chute 41 with substantially uniform initial velocity toward the detection position 43.

The above conventional color sorting apparatuses utilizing the free-fall of the beans to be sorted have no problems in a bichromatic method based on the differences in the light amounts between the reflection light from the surface of the bean to be sorted and the reflection light from the reference color plate.

However, in the color sorting apparatus for detecting mold in the beans, which uses light beams in the near infrared wavelength region and uses as a detection signal a transmitted light which is weaker in intensity than the reflected light, if the beans to be sorted are supplied to the detection position by the free-fall as in the conventional apparatuses, there inevitably occur velocity differences and positional differences among the individual beans in passing through the detection position, so that the transmittance is greatly influenced thereby.

In other words, in the color sorting apparatus utilizing the light beams in the near infrared wavelength region and the transmitted light from the beans to be sorted for the detection of the moldy beans, if the raw material beans are supplied to the detection position by the free-fall as in the conventional apparatuses, it is extremely difficult to obtain stable detection signals, thereby greatly deteriorating the sorting accuracy.

SUMMARY OF THE INVENTION

It is, therefore, an object of the present invention to overcome the problems existing in the conventional color sorting apparatus and to provide an improved color sorting apparatus.

It is another object of the present invention to provide an improved bean supplying and transferring means which can stably transfer the beans to be sorted to the detection position so that stable detection signals based on the transmitted light from the beans to be sorted are obtainable without being influenced by the bean supply and transferring means.

According to one aspect of the invention, there is provided a color sorting apparatus for beans comprising:

a transferring means for transferring beans to be sorted to a detection position;

an illuminating means for illuminating at the detection position the beans transferred by the transferring means;

a light receiving means for receiving a transmitted light transmitted through the bean and outputting a detection signal;

a control means for operating the detection signal, comparing the detection signal operated with a predetermined threshold value to determine whether the bean is a good or defective one, and outputting an ejection signal when the bean is determined as a defective one; and a sorting means for removing the defective bean based on the ejection signal, the transferring means including at least two endless belts defining therebetween a parallel gap on which the beans to be sorted are held in a single stream and a driving means for driving the two endless belts, and the illuminating means being provided above or below the parallel gap defined by the two endless belts and the light receiving means being provided at a position opposite to the illuminating means with the bean transferred by the transferring means being interposed therebetween.

A guide plate for stabilizing the movement of the two endless belts and maintaining the parallel gap between the two endless belts to be constant is provided under the endless belts at the detection position at which the illuminating means and the light receiving means are opposed to each other. The guide plate is provided with at least a detection opening at the portion corresponding to the detection position.

Further, at the position before the above detection opening in the direction of movement of the endless belts, there is provided an exhaust opening for exhausting dust or the like, to which opening a suction means is provided. Also, at the position after the above detection opening in the direction of the endless belt movement, there is provided a sorting opening for the sorting means. The sorting means arranged at the sorting opening is, for example, an air valve means for ejecting with a compressed air a defective bean among the beans to be sorted.

In the apparatus according to the invention, since the bean transferring means is constituted by the two endless belts having a parallel gap defined therebetween which is capable of holding the beans to be sorted in a single stream thereon and the driving means for driving the two endless belts, and since the speed of each of the beans transferred by the bean transferring means, when passing at the detection position, is determined only by the movement speed of the endless belts, there occurs no difference in speeds among individual beans unlike in the conventional color sorting apparatus employing a free-fall method of the beans.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the present invention are explained with reference to the accompanying drawings.

Figure 1:
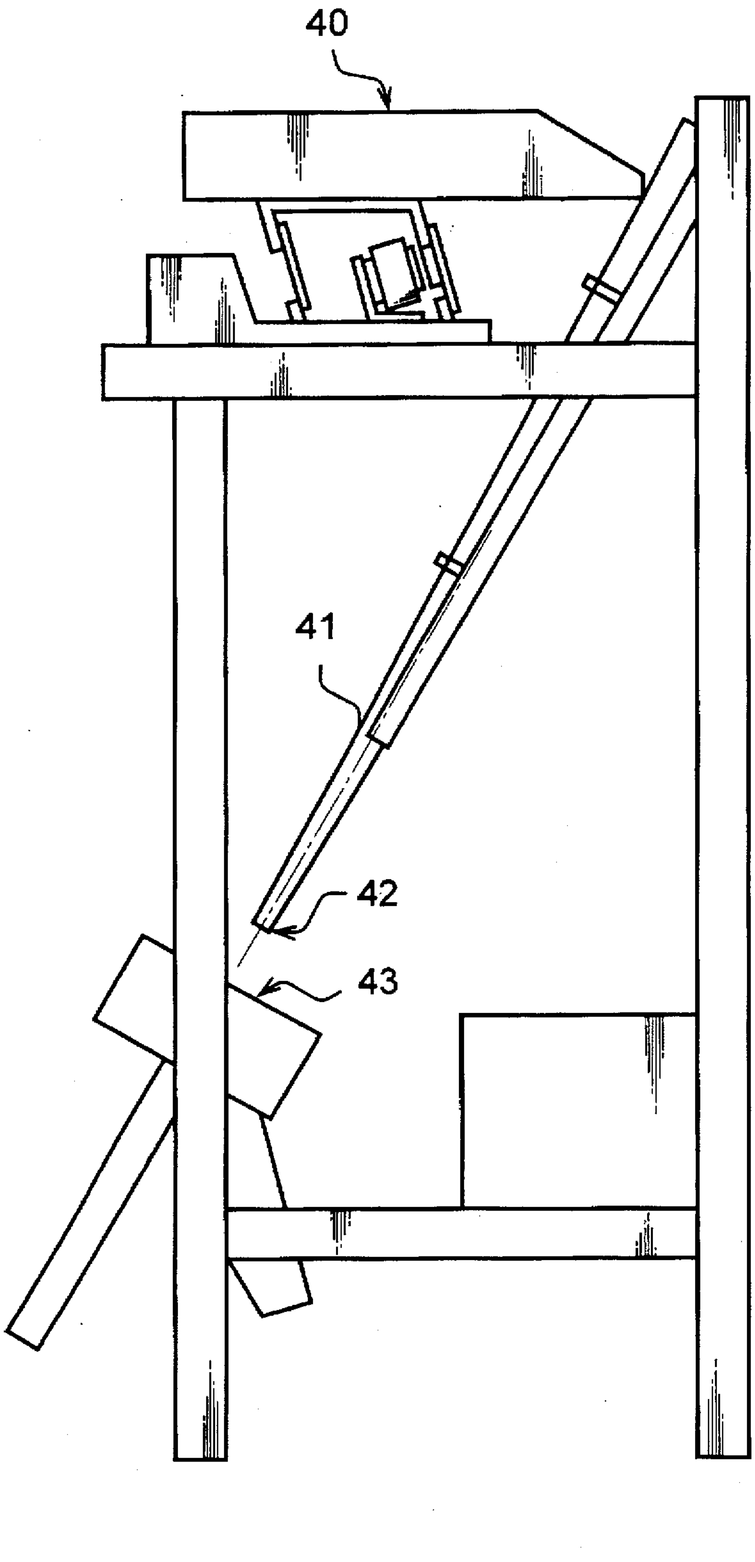
Fig. 1 PRIOR ART
FIG. 1 is a side elevational view of a typical example of a conventional color sorting apparatus.
Figure 2:
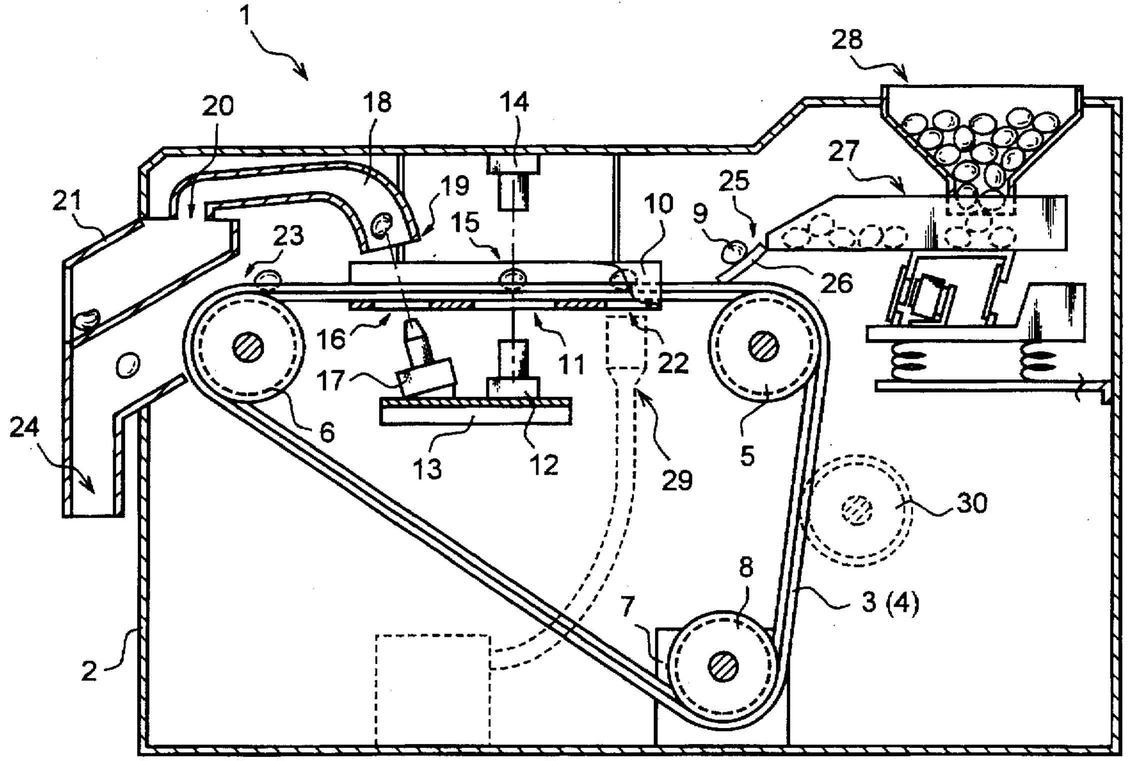
FIG. 2 is a sectional view of a color sorting apparatus of an embodiment according to the present invention.
Figure 3:
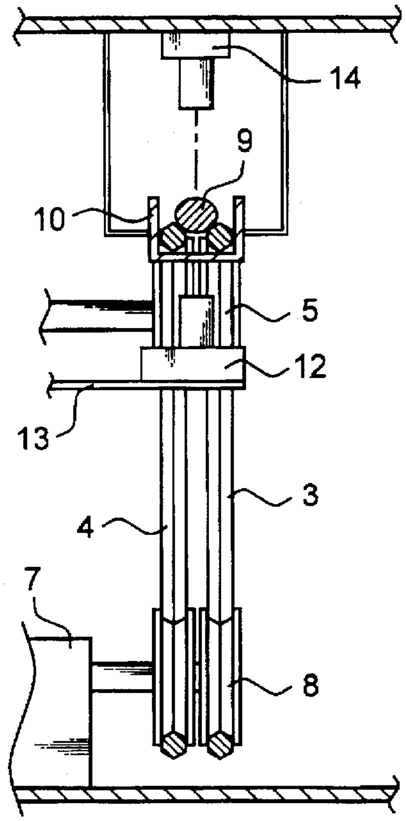
FIG. 3 is an enlarged sectional view of a detection position of the apparatus shown in FIG. 2.
Figure 4:
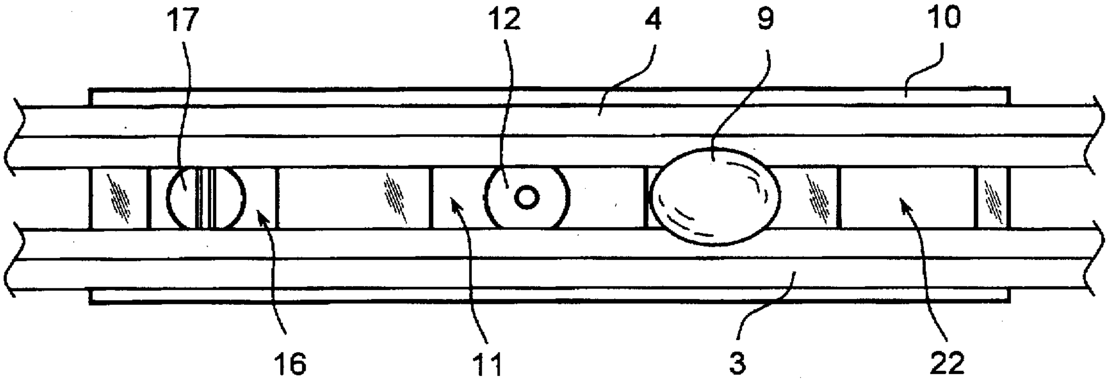
FIG. 4 is a plan view of a detection position of the apparatus shown in FIG. 2.

FIGS. 2–4 show a color sorting apparatus of an embodiment according to the invention, FIG. 2 being a side elevational view thereof, FIG. 3 being an enlarged sectional view of the detection position, and FIG. 4 being a plan view of the detection position.

Referring first to FIG. 2, two endless belts 3 and 4 are carried by pulleys 5 and 6 both of which are provided at substantially the same horizontal level in a machine frame 2, and a pulley 8 which is positioned at a different horizontal level from that of the pulleys 5 and 6 and which is driven by a driving motor 7. The endless belts 3, 4, the pulley 5, 6 and 8, and the driving motor 7 constitute a main part of the transferring means of the present invention. More specifically, the two endless belts 3 and 4 are carried by the pulleys 5, 6 and 8 with a given parallel gap being maintained therebetween. Here, the given parallel gap means the maximum gap at which the beans to be sorted are held between the two endless belts 3 and 4. The parallel gap between the endless belts 3 and 4 are adjusted or changed according to the diameters of the beans to be sorted. The two endless belts 3 and 4 are driven by the driving motor 7 in the same direction and at the same speed. For the purpose of controlling tension applied on the two endless belts 3 and 4, the driving motor 7 is so arranged that the position thereof is adjustable. Alternatively, another pulley 30 for controlling tension may be provided as a tension pulley in addition to the driving and guide pulleys 5, 6 and 8.

A guide plate 10, for stabilizing the movement of the two endless belts and maintaining the parallel gap between the two endless belts to be constant, is fixed to the machine frame 2 at a substantially horizontal portion of the two endless belts 3 and 4 between the pulleys 5 and 6. The illustrated guide plate 10 has a U-shape in section and is fixed to the machine frame 2 with its open portion being directed upwardly. The shape of the guide plate 10 is not limitative to the above U-shape as far as it is capable of stabilizing the movement of the two endless belts and maintaining the parallel gap between the two endless belts to be constant. The two endless belts 3 and 4 may be connected at any given portions of the parallel gap thereof, thereby forming a ladder configuration.

The guide plate 10 has a detection opening 11 so that a bean to be sorted, which is held on the endless belts 3 and 4, can be inspected through the detection opening 11. An illuminating means 12 for illuminating the beans to be sorted is provided at a position corresponding to the detection opening 11 on a supporting plate 13 which is located below the guide plate 10 and secured to the machine frame 2. The illuminating means 12 is constituted by a halogen lamp, a band-pass filter and a converging lens. A sensor 14 for receiving a transmitted light from the beans to be sorted which are illuminated by the illuminating means 12 is secured on the machine frame 2 at the position opposite to the illuminating means 12 with the bean to be sorted being interposed therebetween. The reference numeral 15 denotes a detection position.

The guide plate 10 is provided with a sorting opening 16 at the position after the detection opening 11 in the direction of movement of the endless belts 3 and 4. An air valve 17 for jetting a compressed air so as to eject defective beans among the beans to be sorted outside from the endless belts 3 and 4 is provided on the supporting plate 13. A defective bean exhaust duct 18 is arranged above the sorting opening 16. One open end 19 of the exhaust duct 18 faces the sorting opening 16 and the other open end 20 thereof is connected to a defective bean collecting box 21. The defective beans ejected by the jet air from the air valve 17 are forwarded to the defective bean collecting box 21 through the defective bean exhaust duct 18.

The guide plate 10 may be provided with an exhaust opening 22 at a position before the detection opening 11 in the direction of movement of the endless belts 3 and 4. A dirt or dust adhered on the surface of the bean 9 to be sorted is ejected through the exhaust opening 22 before the bean reaches the detection opening 11, whereby the influence by the dirt or dust on the detection operation is reduced. A suction means 29 may be provided such that it faces the exhaust opening 22, so that the dirt or dust adhered to the beans 9 to be sorted is forcibly sucked-in.

At an outlet side 23 of the endless belts 3 and 4, that is, after the guide plate 10, there is provided a normal bean collecting port 24 through which good beans among the beans 9 to be sorted are discharged outside the apparatus 1. On the other hand, at an inlet side 25 of the endless belts 3 and 4, that is, before the guide plate 10, there is provided a bean supplying means constituted by a vibration feeder 27 and a supplying chute 26. The beans 9 to be sorted are forwarded out one by one by the vibration feeder 27 and, then supplied to the parallel gap between the endless belts 3 and 4. The sectional shape of the chute 26 is such that the beans 9 to be sorted slip down thereon toward the endless belts 3 and 4 without passing over beyond and stopping on the chute 26. A hopper 28 is provided on the vibration feeder 27.

Figure 5:
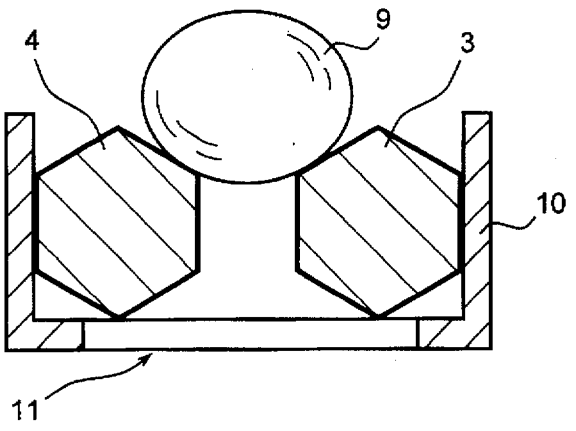
FIG. 5 is a sectional view of endless belts guided by the guide plate.
Figure 6:
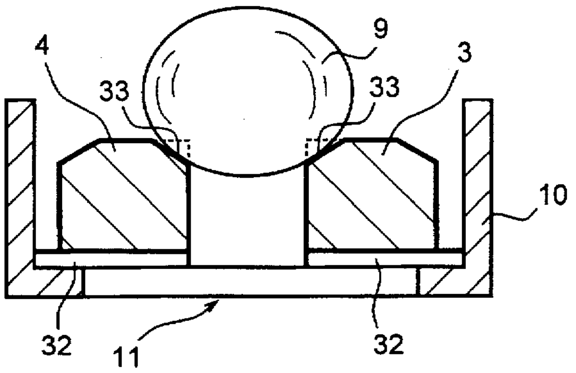
FIG. 6 is a sectional view of another example of the endless belts.

The sectional shape of the endless belts 3 and 4 may be of hexagonal as shown in FIG. 5 or of trapezoidal as shown in FIG. 6. In the latter case, it is desirable that the upper edges of the endless belts 3 and 4, at the sides of the parallel gap between the endless belts 3 and 4, have slanted portions 33 as shown in FIG. 6. Additional belts 32 for reinforcing the endless belts 3 and 4 may be provided to the endless belts 3 and 4, so that the parallel gap between the belts and the movement of the belts are further ensured.

Although the foregoing explanation has been focused on only the structure that the detection is performed on the basis of the transmitted light, for the purposes of increasing the sorting accuracy or the signal detection accuracy, the detection of reflected light may also be carried out in addition to the detection of the transmitted light. Further, it is possible for a light source having a visible wavelength region to be used as the illuminating means.

Figure 7:
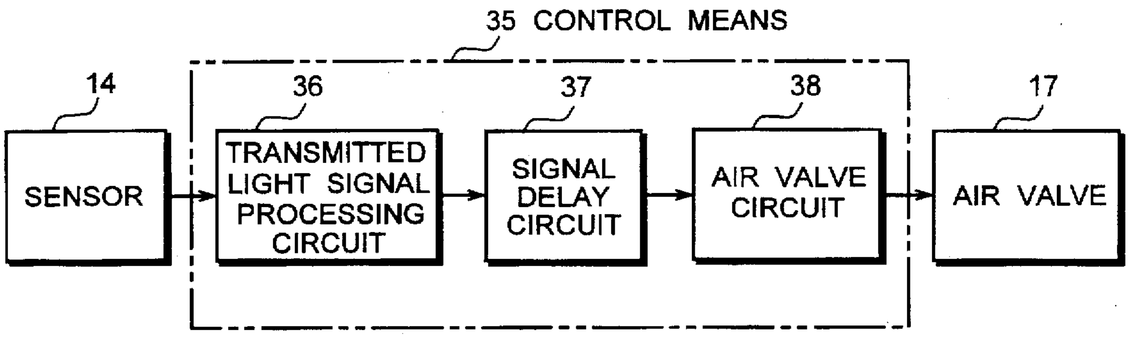
FIG. 7 is a block diagram of a control means used in the apparatus shown in FIG. 2.

Now, the structure of a control means used for the above sorting apparatus 1 is briefly explained with reference to FIG. 7. FIG. 7 is a block diagram of the control means 35 for the bean sorting apparatus according to the invention. The control means 35 comprises a series circuit of a transmitted light signal processing circuit 36 for signal processing of the detection signal forwarded from the sensor 14 as the light receiving means, a signal delay circuit 37, and an air-valve circuit 38 connected to the air valve 17.

The transmitted light signal processing circuit 36 converts the transmitted light signal from the sensor 36 into a digital signal and, then compares the digital signal with a predetermined threshold value which has been set in advance. The signal delay circuit 37 outputs a delayed signal whose delay time corresponds to a distance from a light receiving point of the sensor (light receiving means) 14 to the air valve 17. The air valve circuit 38 outputs an ejection signal to the air valve 17 according to the delayed signal.

The structure wherein the light of a single wavelength in the near infrared wavelength region is illuminated on the beans to be sorted and is received by the sensor has been explained hereinabove as a fundamental structure of the present invention. However, light beams of two kinds of wavelengths different from each other in the near infrared wavelength region, for example, a combination of 700 nm and 1100 nm may be used. In the case where the detection signal is a transmitted light signal based on the two kinds of wavelengths, for example, 700 nm and 1100 nm, the two signals of the transmitted light are first subjected to dividing calculation, and then the calculated divided value is compared with the predetermined threshold value. In this way, the determination is made irrespective of the sizes of individual beans to be sorted.

The illustrated and explained embodiment is a single channel apparatus which is formed by a pair of two endless belts. However, the number of sorting channels is not limited to the single channel. It is of course possible to construct the apparatus to have a plurality of sorting channels.

As has been described hereinabove, according to the present invention, in the color sorting apparatus for detecting such defective beans as moldy beans which uses light beams in the near infrared wavelength region and which uses the transmitted light whose intensity is weaker than the reflected light, there occur no differences in speeds and no differences in positions among the individual beans to be sorted when they pass at the detection position.

In the color sorting apparatus according to the invention wherein the light beams in the near infrared wavelength region are used and the transmitted light from the beans to be sorted is used to detect the defective beans, it is possible to obtain a stable detection signal thereby greatly enhancing the sorting accuracy.

Further, by using the color sorting apparatus according to the present invention, it is possible to perfectly sort out the poisonous beans and to provide more safe beans to the consumer, thus greatly contributing to the food safety improvement.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A color sorting apparatus for beans comprising:

a transferring means for transferring beans to be sorted to a detection position, said transferring means including at least two endless belts defining therebetween a parallel gap on which said beans to be sorted are held in a single stream and a driving means for driving said two endless belts;

an illuminating means for illuminating at said detection position said beans transferred by said transferring means, said illuminating means being provided above or below said parallel gap defined by said two endless belts;

a light receiving means for receiving light transmitted through said bean and for outputting a detection signal, said light receiving means being provided at a position opposite to said illuminating means with said bean transferred by said transferring means being interposed therebetween;

a control means for operating said detection signal, comparing the detection signal operated with a predetermined threshold value to determine whether said bean is a good bean or a defective bean, and outputting an ejection signal when said bean is determined to be a defective bean;

a guide plate arranged under said two endless belts at said detection position, for stabilizing movement of said two endless belts and maintaining said parallel gap defined between said two endless belts to be constant, said guide plate being provided with at least one detection opening through which light passes, at a position corresponding to said detection position, and an exhaust opening for exhausting dust or dirt adhered on a surface of said bean to be sorted, at a position before said detection opening in a direction of movement of said two endless belts;

a sucking means for sucking-in the dust or dirt adhered on the surface of said bean to be sorted, said sucking means being arranged to face said exhaust opening of said guide plate; and a sorting means for removing defective beans based on said detection signal.

2. A color sorting apparatus for beans according to claim 1, wherein said guide plate is further provided with a sorting opening for said sorting means, at a position after said detection opening in a direction of movement of said two endless belts.

3. A color sorting apparatus for beans according to claim 1, wherein said sorting means includes an air valve for removing with compressed air defective beans among said beans transferred by said transferring means, said sorting means being arranged to face said sorting opening of said guide plate.

4. A color sorting apparatus for beans according to claim 1, wherein said driving means of said transferring means is slightly adjustable in its position so that tension applied to said two endless belts is adjustable.

5. A color sorting apparatus for beans according to claim 1, wherein said transferring means includes a tension pulley for applying tension to said two endless belts.

* * * * *